(12) United States Patent
Budinski et al.

(10) Patent No.: US 11,694,107 B1
(45) Date of Patent: Jul. 4, 2023

(54) QUANTUM CIRCUIT FOR COMPUTATIONAL BASIS STATE SHIFT

(71) Applicant: Quanscient Oy, Tampere (FI)

(72) Inventors: Ljubomir Budinski, Tampere (FI);
Ossi Niemimäki, Tampere (FI);
Valtteri Lahtinen, Tampere (FI)

(73) Assignee: Quanscient Oy, Tampere (FI)

( * ) Notice: Subject to any disclaimer, the term of this patent is extended or adjusted under 35 U.S.C. 154(b) by 0 days.

(21) Appl. No.: 18/062,626

(22) Filed: Dec. 7, 2022

(51) Int. Cl.
*G06N 10/20* (2022.01)

(52) U.S. Cl.
CPC .................. *G06N 10/20* (2022.01)

(58) Field of Classification Search
CPC ........ G06N 10/00; G06N 10/20; G06N 10/40; G06N 10/60; G06N 10/70; G06N 10/80
See application file for complete search history.

(56) References Cited

U.S. PATENT DOCUMENTS

| 2010/0182039 | A1* | 7/2010 | Baumgardner | ........ | G06N 10/00 326/6 |
| 2012/0210111 | A1* | 8/2012 | Ozols | ..................... | G06N 10/00 713/1 |
| 2022/0114994 | A1* | 4/2022 | Williams | ................ | G06N 10/20 |
| 2022/0414508 | A1* | 12/2022 | Shyamsundar | ........ | G06N 10/00 |

OTHER PUBLICATIONS

Douglas et al., "Efficient Quantum Circuit Implementation of Quantum Walks", Oct. 29, 2009, arXiv.com, pp. 1-6. (Year: 2009).*
Mark Wilde, "Quantum Shift Register Circuits", Mar. 27, 2009, arXiv.com, pp. 1-18. (Year: 2009).*
Ljubomir Budinski, "Quantum Algorithm for the Advection-Diffusion Equation Simulated with the Lattice Boltzmann Method", Feb. 5, 2021, Quantum Information Processing, pp. 1-17. (Year: 2021).*
Jacob Viertel, "Quantum Computing for Designing Behaviorial Model and Quantum Machine Learning on a Humanoid Robot", Oct. 12, 2020, pp. 1-200 (Year: 2020).*

* cited by examiner

*Primary Examiner* — Paulinho E Smith
(74) *Attorney, Agent, or Firm* — Ziegler IP Law Group

(57) ABSTRACT

A method of setting up a quantum circuit for computational basis state shift. For the quantum circuit, a first quantum register, a second quantum register and a first ancilla register are set up. The first quantum register includes four qubits and the second quantum register includes N−4 qubits. To the first quantum register, the second quantum register and the first ancilla register are applied in a sequential order: (i) an initial step including three CX gates and a first X gate; (ii) a first segment including seven multi-controlled gates; (iii) a second segment comprising a first set of CX gates, a second set of CX gates and a cascade of gates arranged between the first set and the second set; and (iv) a third segment comprising two CX gates and a second X gate.

15 Claims, 11 Drawing Sheets

QUANTUM CIRCUIT FOR COMPUTATIONAL BASIS STATE SHIFT

TECHNICAL FIELD

The present disclosure relates to methods of setting up a quantum circuit for computational basis state shift. Moreover, the present disclosure relates to a quantum computer or a quantum simulator configured to execute the aforesaid methods. Furthermore, the present disclosure also related to a non-transitory computer-readable medium having computer program instructions stored thereon, the computer program instructions being executable by at least one processor in a classical computer to control a quantum computer or a quantum simulator to perform the aforesaid methods.

BACKGROUND

Quantum algorithms that scale logarithmically in terms of the quantum operations with respect to the number of internal qubit states outperform the corresponding classical algorithms that scale linearly or worse, thereby yielding exponential speed-up. The process of state shift is a subroutine in several quantum algorithms. Shifting of the computational basis states along different directions is a building block for a variety of different quantum algorithms. Particularly, in a quantum walk, the computational basis state shift is used together with a coin operator to define a quantum version of a random walk. The computational basis states shift is responsible for propagating a walker to different directions along a geometric walking domain: for a 1D case the walk is performed along a line in left and right directions, while for a 2D case the walker is moving in left, right, up and down directions. The quantum walk itself is used extensively in various applications of quantum computing, such as simulating the random walk on quantum machines, solving a linear system of equation by using Markov chains, simulating hydrodynamic problems based on Madelung transformation, developing effective search quantum algorithms on graphs, and efficient matrix encoding. Hence, optimization of quantum circuits for computational basis state shift serves a concrete need.

Currently known quantum shift procedures have two possible configurations: with or without an additional (variable) ancilla register. The ancilla free configuration leads to an algorithm that scales linearly with the number of possible states, while the introduction of a variable ancilla register provides logarithmic dependence. These two configurations have complementary advantages and disadvantages. Implementing the shift step using the first configuration requires less qubits to be used in the workspace, but the circuit is much deeper than in the second configuration. On the other hand, the second configuration shows smaller execution time and requires a logarithmic number of gates as a function of the size of the state space, but the number of ancilla qubits increases linearly with the number of control qubits, quickly leading to a large workspace. To mitigate these shortcomings, further redesign and optimization of the shift algorithm is required.

SUMMARY

The present disclosure seeks to provide an improved method of setting up a quantum circuit for computational basis state shift. Moreover, the present disclosure seeks to provide a quantum computer or a quantum simulator configured to execute the aforesaid method. The present disclosure also seeks to provide a non-transitory computer-readable medium having computer program instructions stored thereon, the computer program instructions being executable by at least one processor in a classical computer to control a quantum computer or a quantum simulator to perform the aforesaid method. Furthermore, the present disclosure also seeks to provide a solution to the existing problems of conventional quantum shift procedures.

In a first aspect, an embodiment of the present disclosure provides a method of setting up a quantum circuit for computational basis state shift, the method comprising:
  setting up, for the quantum circuit, a first quantum register (f1), a second quantum register (f2) and a first ancilla register (a1), wherein the first quantum register (f1) comprises four qubits ($f1_0, f1_1, f1_2, f1_3$) and the second quantum register (f2) comprises N−4 qubits ($f2_0, \ldots f2_{N-5}$);
  applying to the first quantum register (f1), the second quantum register (f2) and the first ancilla register (a1) in a sequential order:
    (i) an initial step comprising three CX gates and a first X gate;
    (ii) a first segment comprising seven multi-controlled gates;
    (iii) a second segment comprising a first set of CX gates, a second set of CX gates and a cascade of gates arranged between the first set and the second set; and
    (iv) a third segment comprising two CX gates and a second X gate.

In a second aspect, an embodiment of the present disclosure provides a quantum computer or a quantum simulator configured to execute a method according to the aforementioned first aspect.

In a third aspect, an embodiment of the present disclosure provides a non-transitory computer-readable medium having computer program instructions stored thereon, the computer program instructions being executable by at least one processor in a classical computer to control a quantum computer or a quantum simulator to perform a method according to the aforementioned first aspect.

Embodiments of the present disclosure substantially eliminate, or at least partially address the aforementioned problems in the prior art, and facilitate a quantum circuit that can be scaled up easily.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify an item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1A:
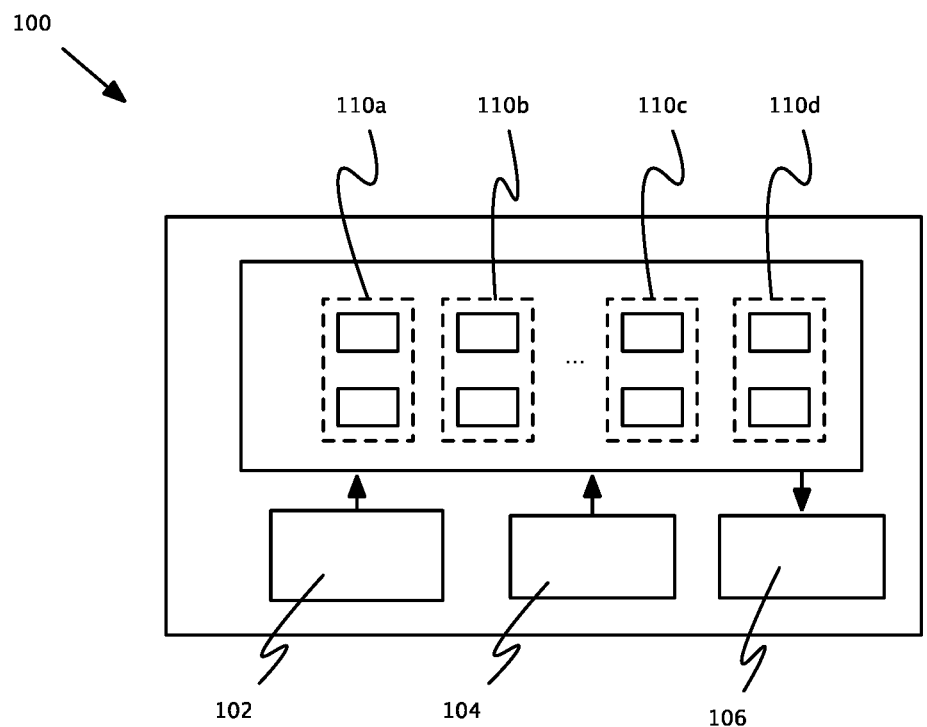
FIG. 1A is a schematic illustration of a quantum computer.

FIG. 1A is a schematic illustration of a quantum computer 100. The quantum computer 100 comprises N qubits, depicted as a first qubit 110$a$, a second qubit 110$b$ and an $N^{th}$ qubit 110$c$. The quantum computer 100 also comprises a first ancilla qubit 110$d$. Each qubit 110$a$, 110$b$, 110$c$ is in a superposition of the ground state |0> and the excited state |1>. The quantum computer 100 further comprises state-preparation means 102 that is to be employed to initialize the quantum computer 100. Moreover, the quantum computer 100 optionally comprises implementation means 104 that is to be employed to set up gates, each gate using one or more of the N qubits, for implementing a quantum algorithm. Furthermore, the quantum computer 100 comprises measurement means 106 that is to be employed to measure a state of one or more of the N qubits after executing the quantum algorithm.

Figure 1B:
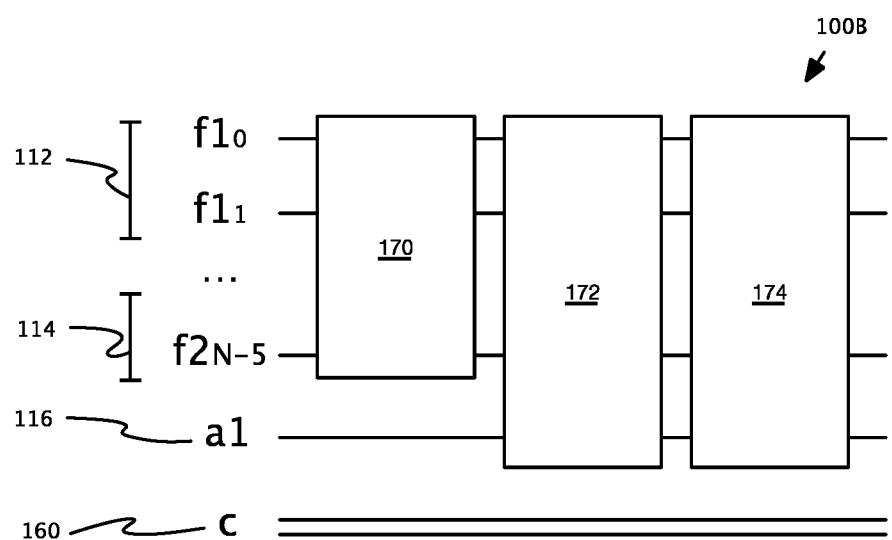
FIG. 1B is a schematic illustration of a quantum circuitry of the quantum computer.

FIG. 1B is a schematic illustration of a quantum circuitry 100B. The quantum circuitry 100B can be illustrated with use of a first quantum register 112 and a second quantum register 114 and a first ancilla register 116. Furthermore, classical registers 160 are also illustrated in the figure. The term "classical register" refers to lines that provide an interface between a quantum computer and a classical computer.

Mapping of the quantum registers to the quantum computer 100 of FIG. 1A is as follows:
f1$_0$ corresponds to the first qubit 110$a$,
f1$_1$ corresponds to the second qubit 110$b$, and so on,
f2$_{n-5}$ corresponds to the $N^{th}$ qubit 110$c$.

These N qubits are referred as working qubits. Naming of the registers is arbitrary. In the present disclosure, the first quantum register 112 comprises four working qubits and the second quantum register 114 comprises N–4 working qubits (where N is larger than 4). As an example, if N=6, the first quantum register 112 comprises working qubits f1$_0$, f1$_1$, f1$_2$, f1$_3$ and the second quantum register 114 comprises working qubits f2$_0$, f2$_1$.

With reference to FIG. 1B, the quantum circuitry 100B comprises an initialization phase 170 in which one or more of the qubits are set up with initial states, an implementation phase 172 in which gates making up the corresponding phase are set up in a sequential manner (namely, in a time-variant quantum system), and a measurement phase 174 following the implementation phase 172.

Basis state shift is needed as a subroutine in various quantum algorithms. Examples of such quantum algorithms include, but are not limited to, quantum walk and efficient block encoding of matrices. Optionally, in this regard, a particular problem that can be executed or simulated on a quantum computer with N working qubits using a quantum algorithm comprising a step of state shift is defined. For example, this can be a mathematical description of a physical process of interest in the domain of quantum walk, or any other procedure involving a propagation step (namely, the step of state shift) as an integral part. The particular problem is then posed, and corresponding parameters are set according to a selection of a configuration of the quantum algorithm (namely, with or without a variable-sized ancilla register) and other necessary requirements depending on the quantum algorithm being used. Optionally, one of the available Software Development Kits (SDKs) are used for working with the quantum computer (for example, such as IBM Qiskit) and a quantum circuit is employed therein. Subsequently, the quantum computer can be employed to execute the quantum circuit.

The basis state shift is defined as a superposition of an increment $S^+$ and a decrement $S^-$, which on their own map a binary-encoded state |k> as follows:

$$S^{\pm}|k\rangle = |k\pm 1\rangle$$

The superposition is induced with a control qubit c, leading to the state shift as a sequence $S^-S^+|k\rangle \otimes c$, where $\otimes$ is the tensor product. In the quantum walk algorithm, the control qubit represents the outcome of the quantum coin flip.

The present disclosure improves the state shift performance by parallelizing the sequence of the increment and decrement operators. This is performed by decomposing the states into even and odd. If a state is even, the increment is achieved by applying an inverter (represented by an X gate in the accompanying drawings) to the least significant qubit; and if a state is odd, the same inverter defines the decrement.

The state decomposition D requires an ancilla qubit a. For an even state $|k\rangle$, the decomposition is given by $|k\rangle \otimes |0\rangle_a$, where the ancilla qubit is marked with a subscript a. For an odd state $|k\rangle$, the decomposition is given by $|k\rangle \otimes |1\rangle_a$, where the ancilla qubit is marked with the subscript a.

After the decomposition, the states are rearranged in such a way that the application of an inverter on the least significant qubit achieves the increment and decrement in parallel. Denoting the rearrangement by R and the inverter by X, the improved state shift is given by a sequence $$D^{-1}XRD|k\rangle \otimes c \otimes a$$

Figure 2A:
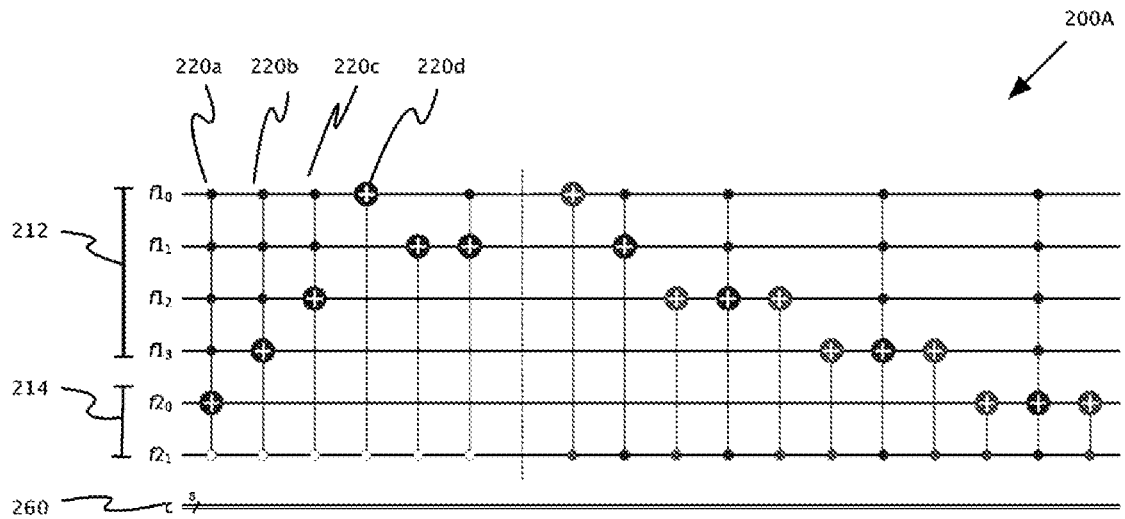
FIG. 2A is schematic illustration of a 6-qubit non-optimized quantum circuit for computational basis state shift.
Figure 2B:
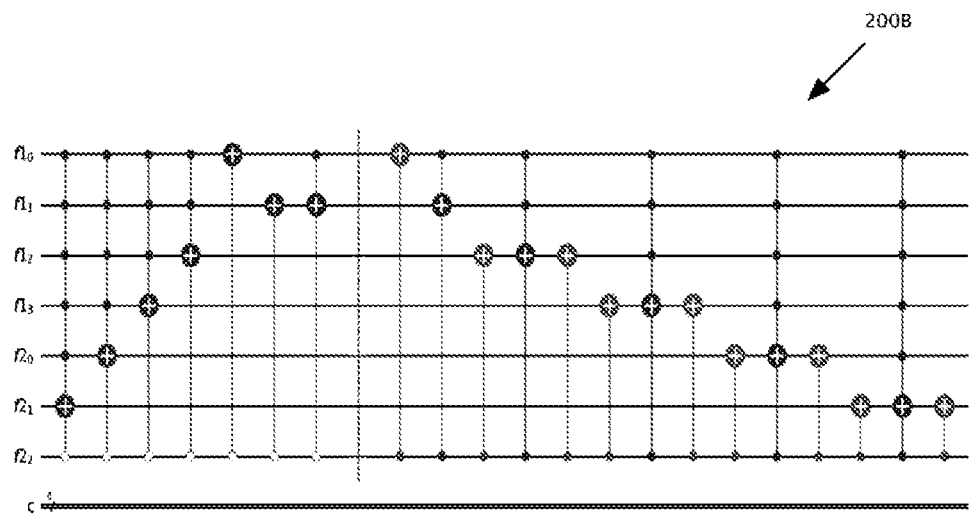
FIG. 2B is schematic illustration of a 7-qubit non-optimized quantum circuit for computational basis state shift.
Figure 2C:
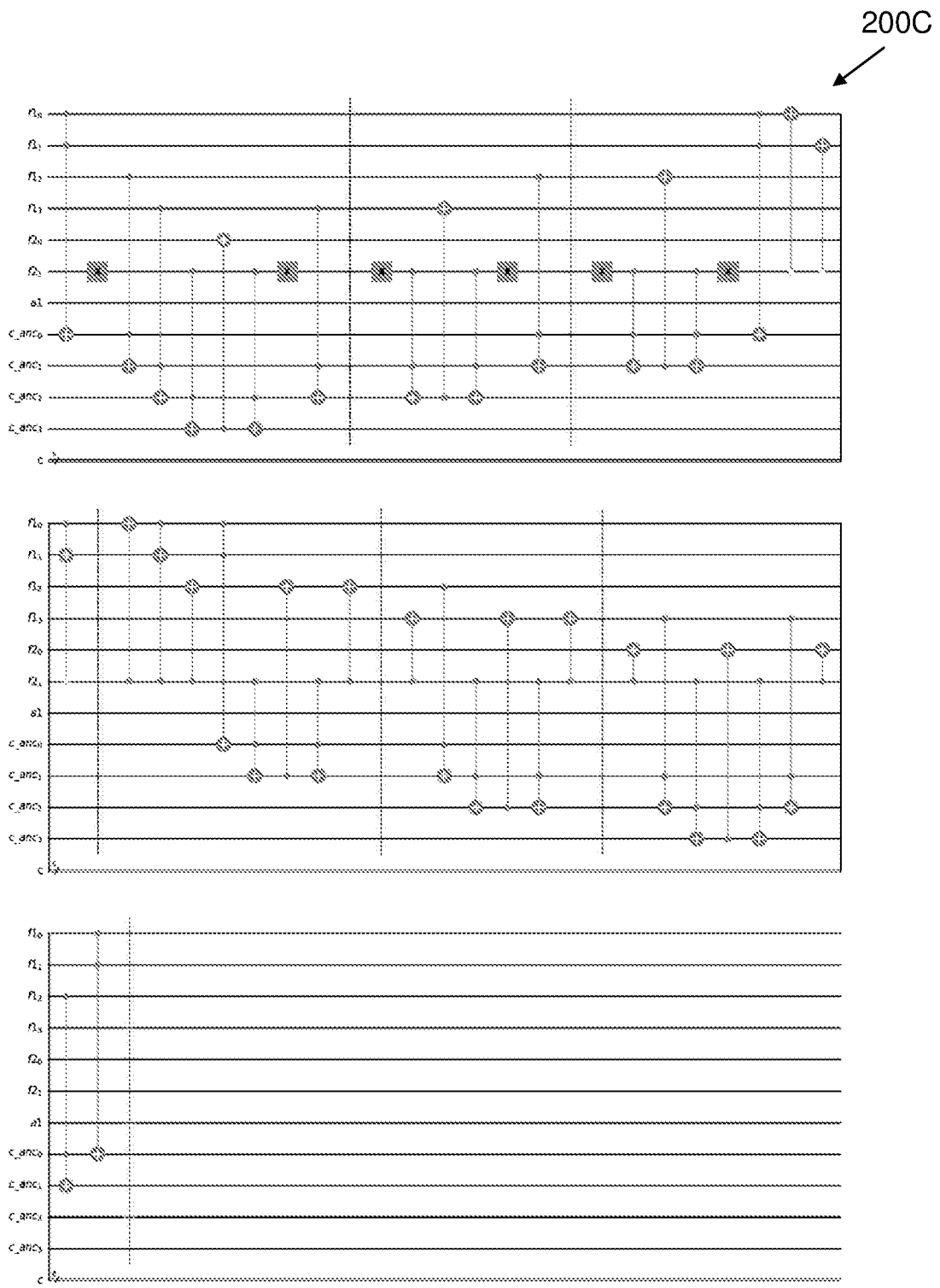
FIG. 2C is a schematic illustration of a variable ancilla register version of the 7-qubit non-optimized quantum circuit of FIG. 2B.

Non-optimized quantum circuits (which represent the prior art) and quantum circuits of the present disclosure will now be illustrated with some example numbers of qubits, for the sake of comparison. FIGS. 2A-2C represent the non-optimized quantum circuits, while FIGS. 3A-3F representing the quantum circuits of the present disclosure.

FIG. 2A is a schematic illustration of a 6-qubit non-optimized quantum circuit 200A for computational basis state shift. The 6-qubit non-optimized quantum circuit 200A is set up using a first quantum register 212 and a second quantum register 214. Total number N of qubits is 6 in this figure. Number of classical registers 260 corresponds to the number of qubits. Furthermore, to define notations, the 6-qubit non-optimized quantum circuit 200A comprises a five-controlled gate 220a, a four-controlled gate 220b, a three-controlled gate 220c, a CX gate 220d, and so on. The gates are implemented in a sequence, i.e., in an order from left to right, as shown in FIG. 2A (and in all further figures illustrating various quantum circuits).

As a further example of notations used in the description, the five-controlled gate 220a in the FIG. 2A uses all qubits of the first quantum register 212 as a first set of controls corresponding to a state of $|1\rangle$ (marked as solid dots in the figure). The five-controlled gate 220a also uses a last working qubit ($f2_1$) of the second quantum register 214 as a control corresponding to a state of $|0\rangle$ (marked as a hollow dot in the figure). The five-controlled gate 220a uses the first working qubit ($f2_0$) of the second quantum register 214 as a target. Throughout the present disclosure, the expressions "use a given qubit as a control" and "use another given qubit as a target" mean that a value of the given qubit (that is "used" as a control) is taken into consideration to decide whether a change is required in a value of the another given qubit (that is "used" as a target). The term "use" with regard to "use a given qubit" is to be understood as employing the given qubit for a particular purpose, namely, as a control or as a target.

Similarly, FIG. 2B is a schematic illustration of a 7-qubit non-optimized quantum circuit 200B for computational basis state shift. Total number N of qubits is 7 in this figure.

A left portion of each of the quantum circuits 200A and 200B (namely, up to a barrier line) applies a right shift, while a right portion of each of the quantum circuits 200A and 200B (namely, after the barrier line) applies a left shift. In essence, each of the quantum circuits 200A and 200B adds one bit (namely, corresponding to a right shift) and subtracts one bit (namely, corresponding to a left shift) from the basis states. In this regard, each of the quantum circuits 200A and 200B performs operations that are completely analogous to a classical method, meaning that it performs the addition and subtraction operations exactly in the same way as would be done on classical computers. This means that no quantum speedup is achieved by the quantum circuits 200A and 200B.

Scaling-wise, each new qubit added to such a quantum circuit (namely, 200A or 200B) introduces two new multi-controlled gates with N–1 controls (as is evident from a comparison of FIGS. 2A and 2B). For a scaling analysis for this non-optimized configuration, the quantum circuits 200A and 200B can be decomposed, for example, using the IBM set of basis gates (I, SX, X, RZ and CX) with the IBM Qiskit transpiler. The transpilation transforms the general form of the algorithm (as shown in FIGS. 2A and 2B) into a device-specific set of operations, which can then be executed on quantum hardware. In this regard, FIG. 2C is a schematic illustration of a variable ancilla register version 200C of the 7-qubit non-optimized quantum circuit 200B of FIG. 2B. The variable ancilla register version 200C is generated by applying decomposition using a variable ancilla register (c_anc) to the non-optimized quantum circuit 200B.

Figure 4A:
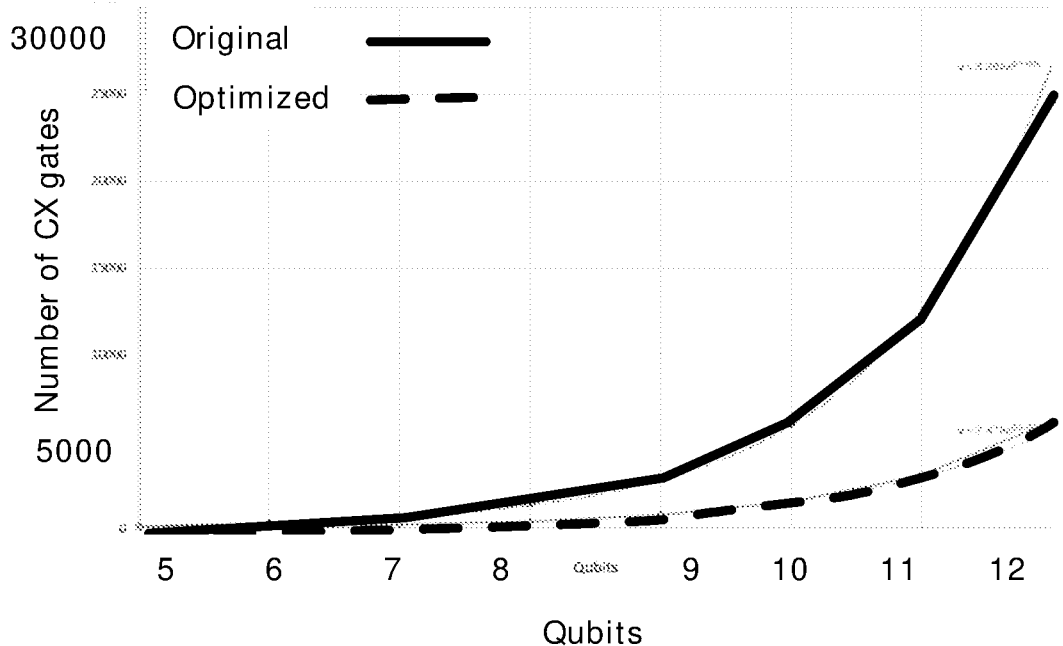
FIG. 4A is a graph illustrating the number of CX gates (y-axis) as a function of qubits (x-axis) comparing an ancilla-free configuration of the non-optimized quantum circuits and a fixed-ancilla register configuration of the quantum circuits of the present disclosure.
Figure 4B:
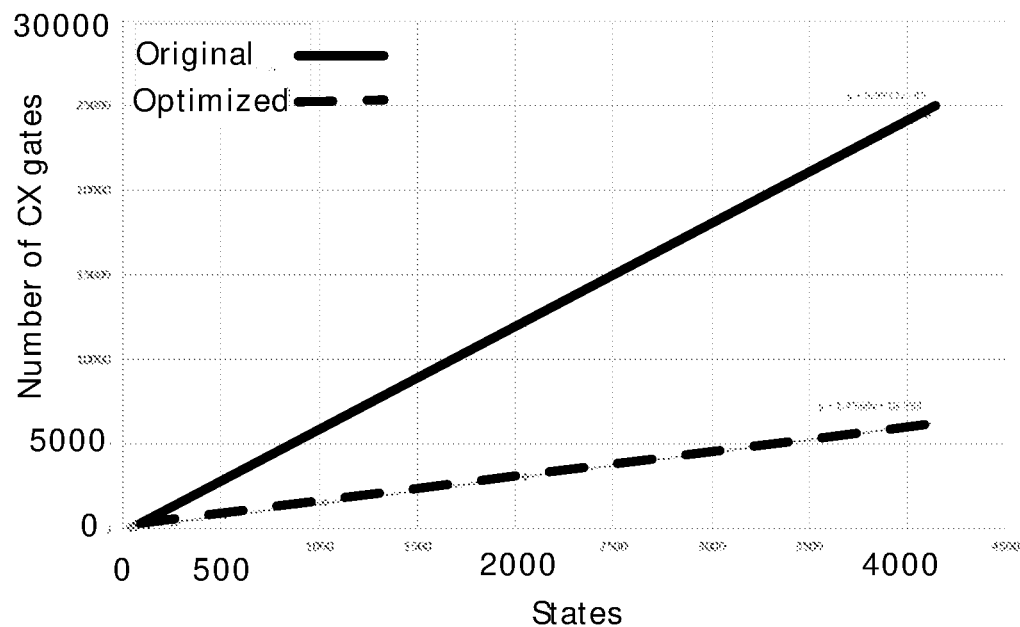
FIG. 4B is a graph illustrating the number of CX gates (y-axis) as a function of states (x-axis) comparing the ancilla-free configuration of the non-optimized quantum circuits and the fixed-ancilla register configuration of the quantum circuits of the present disclosure.

The dependence of the number of CX gates (regarded computationally the most expensive operations) with respect to the number of qubits and computational states for additional (variable) ancilla register version of the algorithm has been depicted with solid lines in FIGS. 4A and 4B, respectively. There is an exponential dependence in the number of CX gates with respect to the number of qubits, and a clear linear dependence of the number of CX gates with the number of computational states.

It will be appreciated that the non-optimized quantum circuits 200A and 200B pertain to an ancilla-free configuration. In order to optimize the quantum circuits, at least one fixed ancilla register can be implemented, as shown in FIGS. 3A-3F. Moreover, the number of working qubits depends on the dimensionality of the problem to be solved. If new qubits are introduced into the quantum circuit in order to increase the dimensionality of the problem to be solved, they are added into the second quantum register (f2), while the first quantum register (f1) is fixed and comprises four qubits. Let N be the total number of working qubits in the quantum algorithm.

Figure 3A:
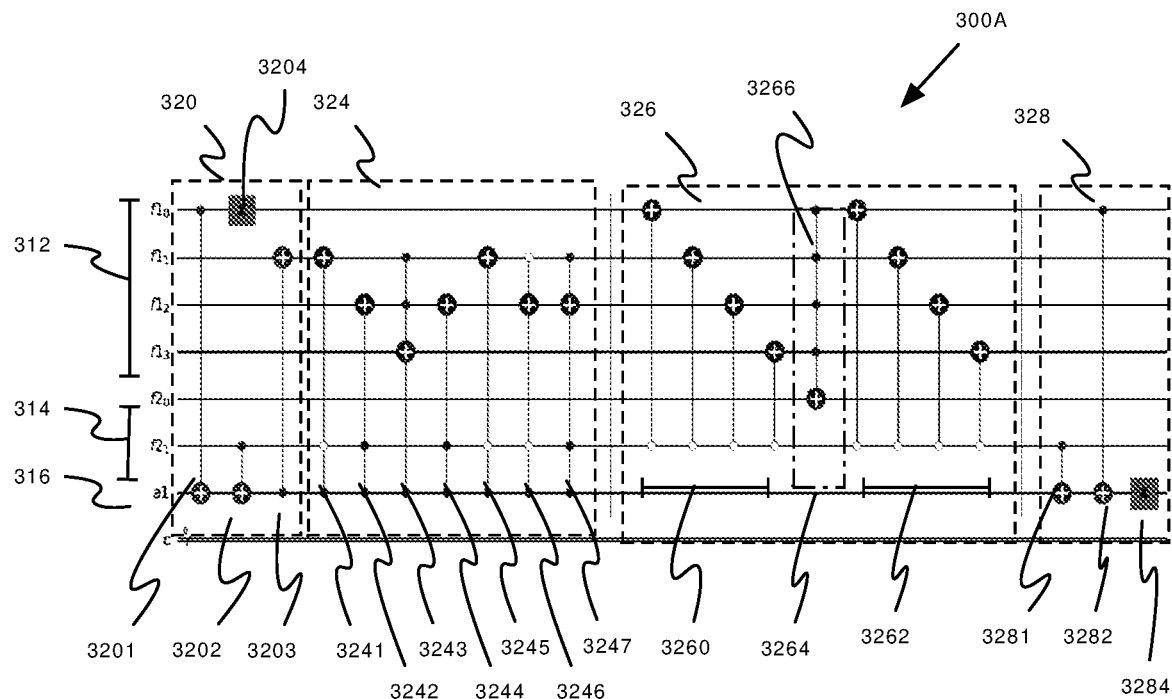
FIGS. 3A, 3B and 3C are schematic illustrations of a setup of quantum circuits for computational basis state shift, for 6, 7 and 8 qubits, respectively, in accordance with an embodiment of the present disclosure.
Figure 3B:
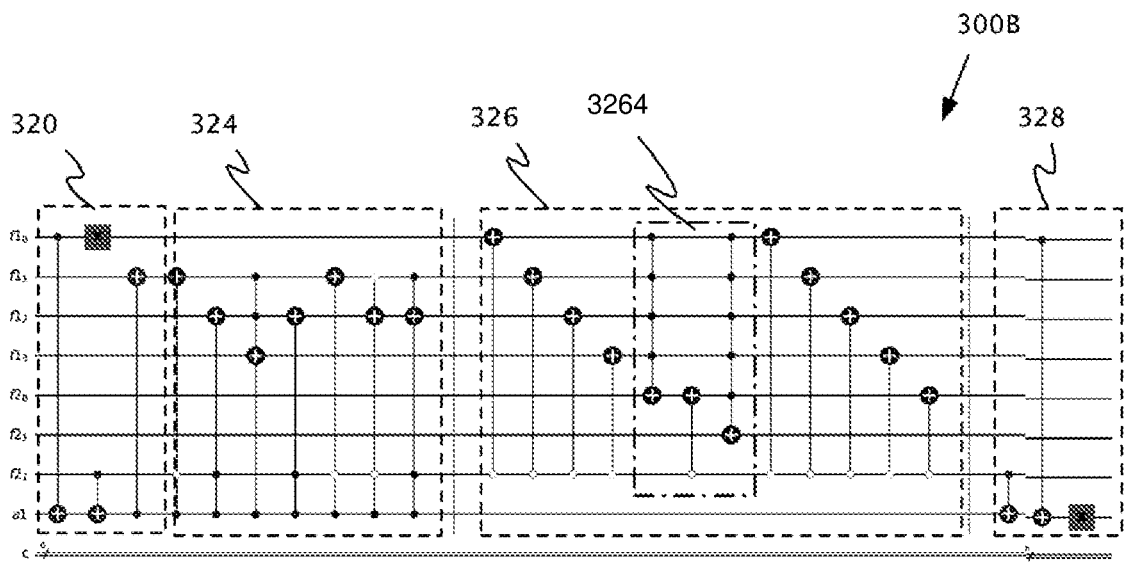
Figure 3C:
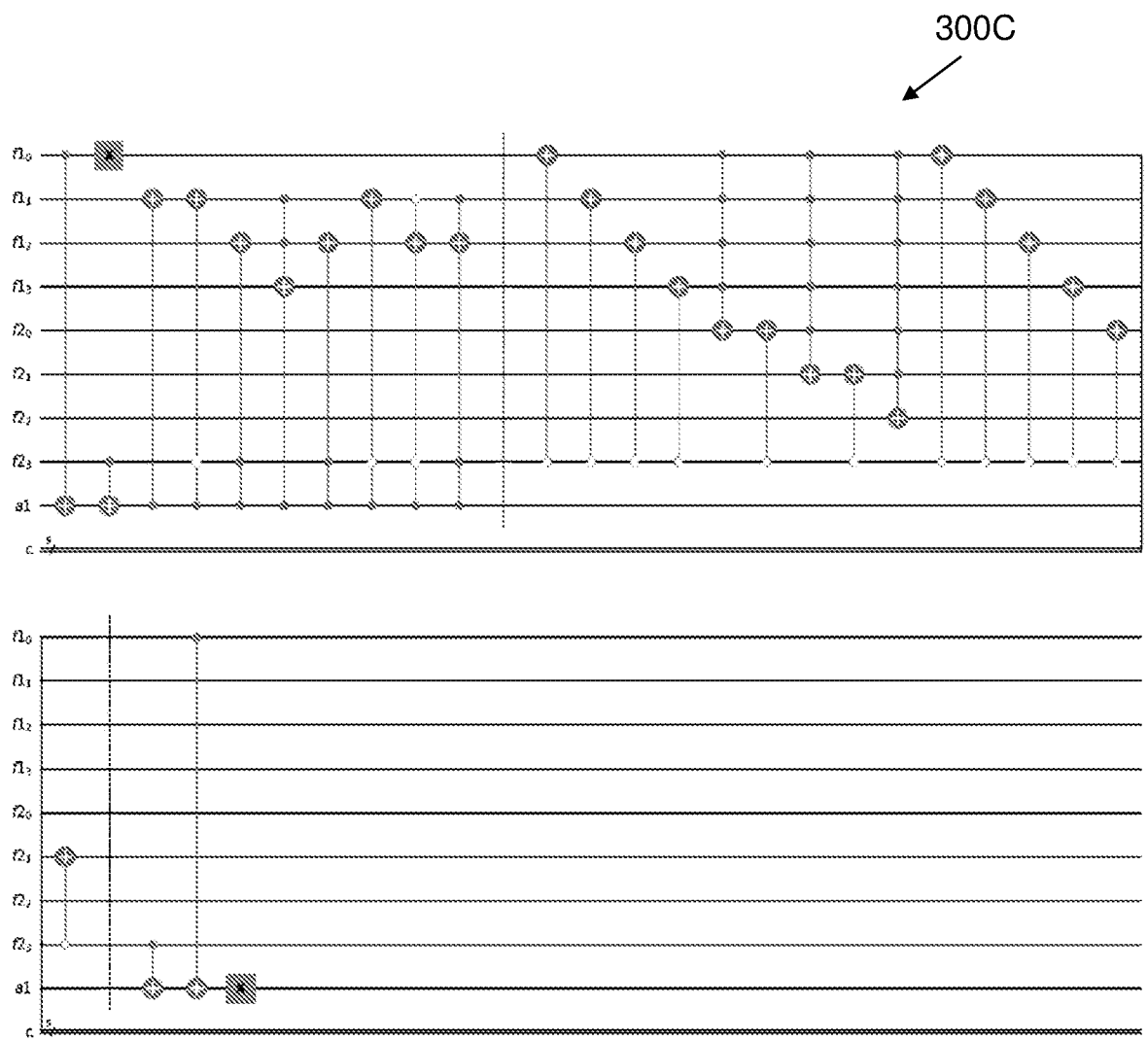

FIGS. 3A, 3B and 3C are schematic illustrations of a setup of quantum circuits 300A, 300B and 300C for computational basis state shift, for N=6, 7 and 8, respectively, in accordance with an embodiment of the present disclosure. The quantum circuits 300A, 300B and 300C can be employed for shift (namely, left and right shift). The shift can be one-dimensional or multi-dimensional. It will be appreciated that the state shift is one-dimensional, but it can be used to shift one state or a group of states, depending on which group of qubits is used. In other words, by applying the same algorithm (represented by the aforesaid quantum circuits 300A, 300B and 300C) on different groups of qubits, a group of states can be shifted. With reference to FIG. 3A, the quantum circuit 300A pertains to an example case where a total number of working qubits is 6 (that is, N=6). With reference to FIG. 3B, the quantum circuit 300B pertains to another example case where the total number of working qubits is 7 (that is, N=7). With reference to FIG. 3C, the quantum circuit 300C pertains to yet another example case where the total number of working qubits is 8 (that is, N=8).

Each of the quantum circuits 300A, 300B and 300C are set up using a first quantum register 312 (f1), a second quantum register 314 (f2), and a first ancilla register 316 (a1), wherein the first quantum register 312 (f1) comprises four working qubits ($f1_0$, $f1_1$, $f1_2$, $f1_3$) and the second quantum register 314 (f2) comprises N-4 working qubits ($f2_0$, ... $f2_{N-5}$). The number of qubits in the first ancilla register 316 (a1) is fixed, and is equal to one.

Each of the quantum circuits 300A, 300B and 300C is applied to the first quantum register 312 (f1), the second quantum register 314 (f2) and the first ancilla register 316 (a1), wherein each of the quantum circuits 300A, 300B and 300C comprises in a sequential order:

(i) an initial step 320 comprising three CX gates 3201, 3202 and 3203 and a first X gate 3204;

(ii) a first segment 324 comprising seven multi-controlled gates 3241-3247;

(iii) a second segment 326 comprising a first set of CX gates 3260, a second set of CX gates 3262 and a cascade of gates 3264 arranged between the first set and the second set; and (iv) a third segment 328 comprising two CX gates 3281 and 3282, and a second X gate 3284.

As mentioned earlier, the gates in each of the quantum circuits 300A, 300B and 300C are implemented in a sequence, i.e., in an order from left to right. The quantum circuits 300A, 300B and 300C bring technical benefits, which are at least in part achieved by adding the first ancilla register 316 (a1), which is a fixed ancilla register. The technical benefit of each of the quantum circuits 300A, 300B and 300C is that when the number of working qubits is increased, only the second segment 326 of these quantum circuits is required to be changed by adding more gates to the second set of CX gates 3262 and the cascade of gates 3264. It will be appreciated that when an additional qubit is introduced in the quantum circuit, there is no change in the initial state 320, the first segment 324 and the third segment 328. In particular, there is no change in the number of controls in the multi-controlled gates 3241-3247 of the first segment 324, which can be seen by comparing FIGS. 3A, 3B and 3C. As a result, the quantum circuits 300A, 3006 and 300C are susceptible to be scaled up easily. Moreover, the scale up of the quantum circuits 300A, 300B and 300C is much less expensive as compared to the scale up of the non-optimized quantum circuit 200A and 200B, as will be elucidated with graphs in FIGS. 4A-4D. It will be appreciated that the second segment 326 is completely omitted when N is not greater than 5.

The quantum circuits 300A, 300B and 300C as well as other quantum circuits that are scaled up for a larger number of working qubits, as explained herein below, can be employed for the shift (propagation) of the basis states on quantum computers. Being a crucial part of several different quantum algorithms, these quantum circuits are optimized to provide a significant quantum speedup in comparison to the currently known quantum circuits (for example, as illustrated in conjunction with FIGS. 2A and 2B). Moreover, pursuant to embodiments of the present disclosure, these quantum circuits are shorter and more efficient for both configurations—namely, a fixed ancilla register configuration (as illustrated in conjunction with FIGS. 3A, 3B and 3C) and a variable ancilla register configuration (as illustrated in conjunction with FIGS. 3D, 3E and 3F), as compared to the currently known quantum circuits. These quantum circuits can be straightforwardly used as a subroutine in several different applications such as quantum walk and efficient block encoding of matrices.

Optionally, the three CX gates 3201-3203 of the initial step 320 are applied in a sequential order of:

a first CX gate 3201 of the initial step that uses a first working qubit ($f1_0$) of the first quantum register 312 ($f_1$) as a control corresponding to a state of |1>, and an ancilla qubit of the first ancilla register 316 (a1) as a target;

a second CX gate 3202 of the initial step that uses a last working qubit ($f2_{N-5}$) of the second quantum register 314 (f2) as a control corresponding to a state of |1>, and the ancilla qubit of the first ancilla register 316 (a1) as a target; and a third CX gate 3203 of the initial step that uses the ancilla qubit of the first ancilla register 316 (a1) as a control corresponding to a state of |1>, and a second working qubit ($f1_1$) of the first quantum register 312 (f1) as a target; and the first X gate 3204 of the initial step is applied to the first working qubit ($f1_0$) of the first quantum register 312 (f1).

Optionally, the seven multi-controlled gates 3241-3247 of the first segment 324 are applied in a sequential order of: a first multi-controlled gate 3241, a second multi-controlled gate 3242, a third multi-controlled gate 3243, a fourth multi-controlled gate 3244, a fifth multi-controlled gate 3245, a sixth multi-controlled gate 3246, and a seventh multi-controlled gate 3247, wherein:

the first multi-controlled gate 3241 and the fifth multi-controlled gate 3245 use the last working qubit ($f2_{N-5}$) of the second quantum register 314 (f2) as a first control corresponding to a state of |0>, the ancilla qubit of the first ancilla register 316 (a1) as a second control corresponding to a state of |1>, and the second working qubit ($f1_1$) of the first quantum register 312 (f1) as a target;

the second multi-controlled gate 3242 and the fourth multi-controlled gate 3244 use the last working qubit ($f2_{N-5}$) of the second quantum register 314 (f2) and the ancilla qubit of the first ancilla register 316 (a1) as controls corresponding to a state of |1>, and a third working qubit ($f1_2$) of the first quantum register 312 (f1) as a target;

the third multi-controlled gate 3243 uses the second working qubit ($f1_1$) of the first quantum register 312 (f1), the third working qubit ($f1_2$) of the first quantum register (f1) and the ancilla qubit of the first ancilla register 316 (a1) as controls corresponding to a state of |1>, and a fourth working qubit ($f1_3$) of the first quantum register (f1) as a target;

the sixth multi-controlled gate 3246 uses the second working qubit ($f1_1$) of the first quantum register 312 (f1) and the last working qubit ($f2_{N-5}$) of the second quantum register 314 (f2) as controls corresponding to a state of |0>, the ancilla qubit of the first ancilla register 316 (a1) as a control corresponding to a state of |1>, and the third working qubit ($f1_2$) of the first quantum register (f1) as a target; and the seventh multi-controlled gate 3247 uses the second working qubit ($f1_1$) of the first quantum register 312 (f1), the last working qubit ($f2_{N-5}$) of the second quantum register 314 (f2) and the ancilla qubit of the first ancilla register 316 (a1) as controls corresponding to a state of |1>, and the third working qubit ($f1_2$) of the first quantum register (f1) as a target.

Optionally, the first set of CX gates 3260 of the second segment 326 comprises four CX gates that use in following order: the first working qubit ($f1_0$), the second working qubit ($f1_1$), the third working qubit ($f1_2$) and the fourth working qubit ($f1_3$) of the first quantum register 312 (f1) as respective targets, each of the four CX gates of the first set of CX gates 3260 using the last working qubit ($f2_{N-5}$) of the second quantum register 314 (f2) as a control corresponding to a state of |0>.

Additionally, optionally, the second set of CX gates 3262 of the second segment 326 comprises N−2 CX gates that use in following order: the first working qubit ($f1_0$), the second working qubit ($f1_1$), the third working qubit ($f1_2$) and up to (N−2)$^{th}$ working qubit as respective targets, each of the N−2 CX gates of the second set of CX gates 3262 using the last working qubit ($f2_{N-5}$) of the second quantum register 314 (f2) as a control corresponding to a state of |0>. Herein, the (N−2)$^{th}$ working qubit could be a working qubit of the first quantum register (f1) or the second quantum register (f2) depending on the value of N. As an example, for N=6, the second set of CX gates 3262 comprises four CX gates, and the (N−2)$^{th}$ working qubit is a 4th working qubit in the quantum circuit 300A, which is the fourth working qubit ($f1_3$) of the first quantum register (f1), which is used as the target of the last one of the four CX gates, as shown in FIG. 3A. For N>6, the (N−2)$^{th}$ working qubit is a working qubit ($f2_{N-7}$) of the second quantum register (f2). As an example, for N=7, the second set of CX gates 3262 comprises five CX gates, and the (N−2)$^{th}$ working qubit is the first working qubit ($f2_0$) of the second quantum register (f2), which is used as the target of the last one of the five CX gates, as shown in FIG. 3B. As another example, for N=8, the second set of CX gates 3262 comprises six CX gates, and the (N−2)$^{th}$ working qubit is the second working qubit ($f2_1$) of the second quantum register (f2), which is used as the target of the last one of the six CX gates, as shown in FIG. 3C.

Yet additionally, optionally, the cascade of gates 3264 is arranged after the first set of CX gates 3260 and before the second set of CX gates 3262, and wherein a number of gates in the cascade is a function of a total number (N) of working qubits. It will be appreciated that the second set of CX gates 3262 and the cascade of gates 3264 are dependent on the value of N, and allow for easy scaling up of the quantum circuits 300A, 300B and 300C.

Optionally, the cascade of the gates 3264 comprises:
N−5 multi-controlled gates 3266 arranged as a sequence of gates indexed from 1 to N−5, wherein within the sequence, a multi-controlled gate indexed 'M' uses as controls all working qubits in the first quantum register (f1) and M−1 first working qubits of the second quantum register, wherein the controls correspond to a state of |1>, and uses as a target M$^{th}$ working qubit of the second quantum register (f2); and
N−6 CX gates, if N is greater than 6,
wherein the N−5 multi-controlled gates and the N−6 CX gates are arranged in an interleaved manner, the cascade of the gates starting with a first multi-controlled gate from amongst the N−5 multi-controlled gates, each CX gate using the last working qubit ($f2_{N-5}$) of the second quantum register (f2) as a control corresponding to a state of |0>, wherein an L$^{th}$ CX gate uses as a target a same working qubit that is used as a target by an L$^{th}$ multi-controlled gate.

Herein, a first one of the N−5 multi-controlled gates 3266 (that is, a multi-controlled gate indexed '1'; M=1) uses as controls all working qubits ($f1_0$, $f1_1$, $f1_2$, $f1_3$) in the first quantum register 312 (f1), wherein the controls correspond to a state of |1>, and uses as a target the first working qubit ($f2_0$) of the second quantum register 314 (f2). Therefore, the first one of the N−5 multi-controlled gates 3266 is a four-controlled gate, as shown in FIG. 3A.

Likewise, a second one of the N−5 multi-controlled gates 3266 (that is, a multi-controlled gate indexed '2'; M=2) uses as controls all working qubits ($f1_0$, $f1_1$, $f1_2$, $f1_3$) in the first quantum register 312 (f1) and the first working qubit ($f2_0$) in the second quantum register 314 (f2), wherein the controls correspond to a state of |1>, and uses as a target the second working qubit ($f2_1$) of the second quantum register 314 (f2). Therefore, the second one of the N−5 multi-controlled gates 3266 is a five-controlled gate, as shown in FIGS. 3B and 3C.

Similarly, a third one of the N−5 multi-controlled gates 3266 (that is, a multi-controlled gate indexed '3'; M=3) uses as controls all working qubits ($f1_0$, $f1_1$, $f1_2$, $f1_3$) in the first quantum register 312 (f1) and the first working qubit ($f2_0$) and the second working qubit ($f2_1$) in the second quantum register 314 (f2), wherein the controls correspond to a state of |1>, and uses as a target the third working qubit ($f2_2$) of the second quantum register 314 (f2). Therefore, the third one of the N−5 multi-controlled gates 3266 is a six-controlled gate, as shown in FIG. 3C.

Moreover, as shown in FIGS. 3B and 3C, the N−5 multi-controlled gates and the N−6 CX gates are arranged in an interleaved manner, the cascade of the gates starting with the first one of the N−5 multi-controlled gates. Each CX gate uses the last working qubit ($f2_{N-5}$) of the second quantum register (f2) as a control corresponding to a state of |0>, wherein an L$^{th}$ CX gate uses as a target a same working qubit that is used as a target by an L$^{th}$ multi-controlled gate. As an example, in FIGS. 3B and 3C, a first one of the N−6 CX gates (namely, for L=1) uses as a target the first working qubit ($f2_0$) of the second quantum register (f2), which is also used as a target by the first one of the N−5 multi-controlled gates 3266. As another example, in FIG. 3C, a second one of the N−6 CX gates (namely, for L=2) uses as a target the second working qubit ($f2_1$) of the second quantum register (f2), which is also used as a target by the second one of the N−5 multi-controlled gates 3266.

It will be appreciated that the second segment 326 is a modular segment. As illustrated in FIGS. 3B and 3C, an addition of each new qubit into the quantum circuit introduces one multi-controlled gate with N−2 controls (starting from the first working qubit ($f1_0$)) and two CX gates having the last working qubit as a control and a third last working qubit ($f2_{n-7}$) as a target. This dynamic is maintained for each new qubit that is added to the quantum circuit.

Moreover, optionally, the two CX gates 3281 and 3282, and the second X gate 3284 of the third segment 328 are applied in a sequential order of:
a first CX gate 3281 of the third segment that uses the last working qubit ($f2_{N-5}$) of the second quantum register 314 (f2) as a control corresponding to a state of |1>, and the ancilla qubit of the first ancilla register 316 (a1) as a target; and
a second CX gate 3282 of the third segment that uses the first working qubit ($f1_0$) of the first quantum register 312 (f1) as a control corresponding to a state of |1>, and the ancilla qubit of the first ancilla register 316 (a1) as a target,
wherein the second X gate 3284 of the third segment is applied to the ancilla qubit of the first ancilla register 316 (a1).

For a scaling analysis for these optimized ancilla configurations, the quantum circuits 300A-300C can be decomposed, for example, using the IBM set of basis gates (I, SX, X, RZ and CX) with the IBM Qiskit transpiler. The transpilation transforms the general form of the quantum algorithm (as shown in FIGS. 3A-3C) into a device-specific set of operations, which can then be executed on quantum hardware. The dependence of the number of CX gates (regarded computationally the most expensive operations)

with respect to the number of qubits and computational states has been depicted with dashed lines in FIGS. 4A and 4B, respectively. In this comparison we assume that the qubits are fully connected (all-to-all qubit connectivity), so that no additional SWAP gates are needed. There is a much smaller increase in the number of CX gates with respect to the number of qubits in the quantum circuits 300A-300C, as compared to the quantum circuits 200A-200B. Moreover, the linear slope of the dashed line in FIG. 4B is 1.49 (for the optimized quantum circuit), which is much reduced from 5.99 (for the non-optimized quantum circuit). This confirms that the optimized quantum circuits 300A-300C provide a scaling that considerably exceeds the classical computation in terms of required operations. In other words, by using the properties of the quantum system (namely, interference and superposition), this new optimized algorithm provides a scaling (hence, in theory, a computational quantum speed up) which cannot be achieved on classical machines.

At the cost of introducing one ancilla qubit, namely, the ancilla qubit of the first ancilla register 316 (a1), the quantum circuits 300A-300C perform significantly better than the non-optimized quantum circuits 200A-200B. It will be appreciated that the number of qubits in the first ancilla register (a1) is independent of an expansion of a working register (namely, the second quantum register 214 (f2)) and is fixed to one qubit.

Figure 3D:
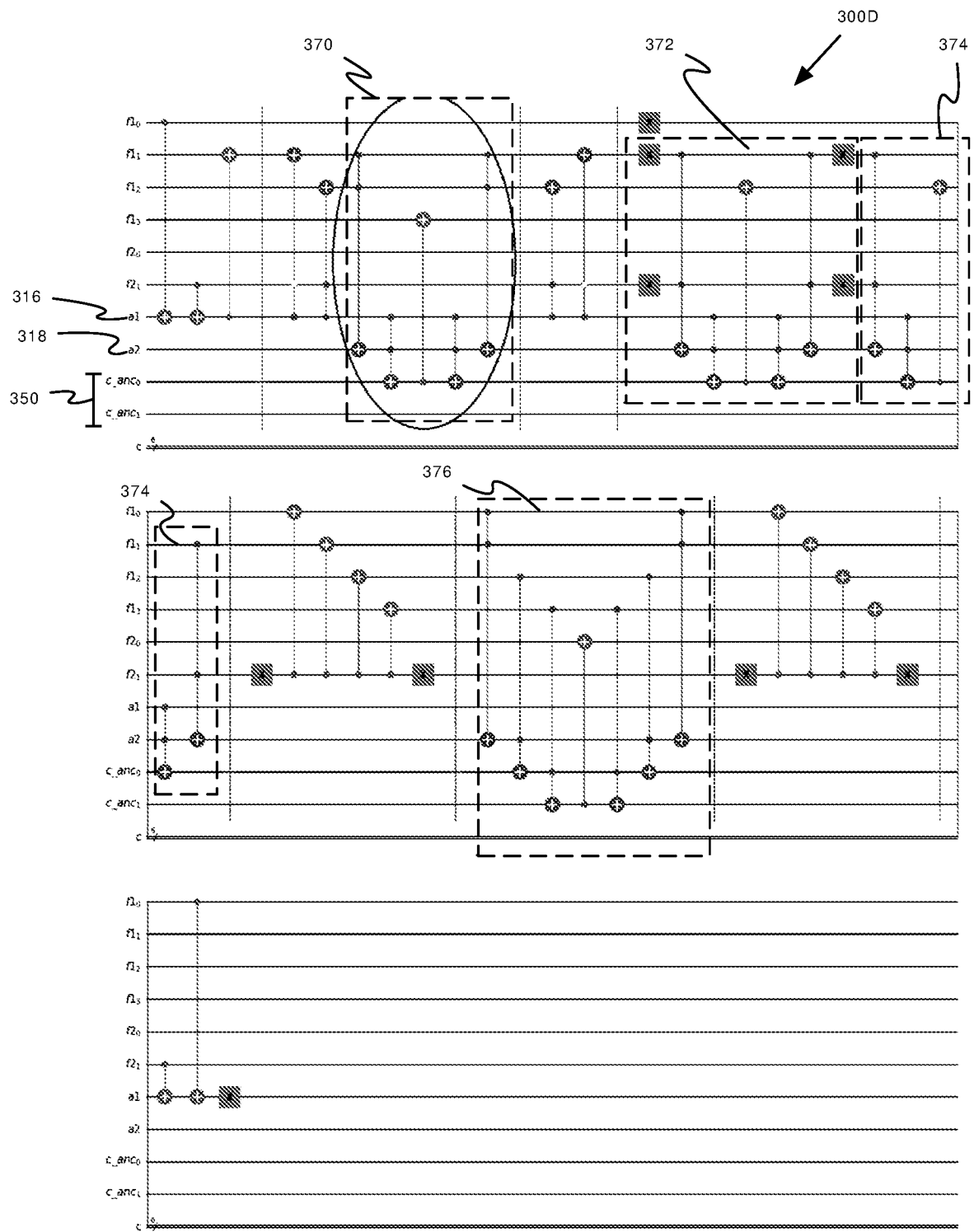
FIGS. 3D, 3E and 3F are schematic illustrations of variable ancilla register versions of the quantum circuits of FIGS. 3A, 3B and 3C, respectively, in accordance with an embodiment of the present disclosure.
Figure 3E:
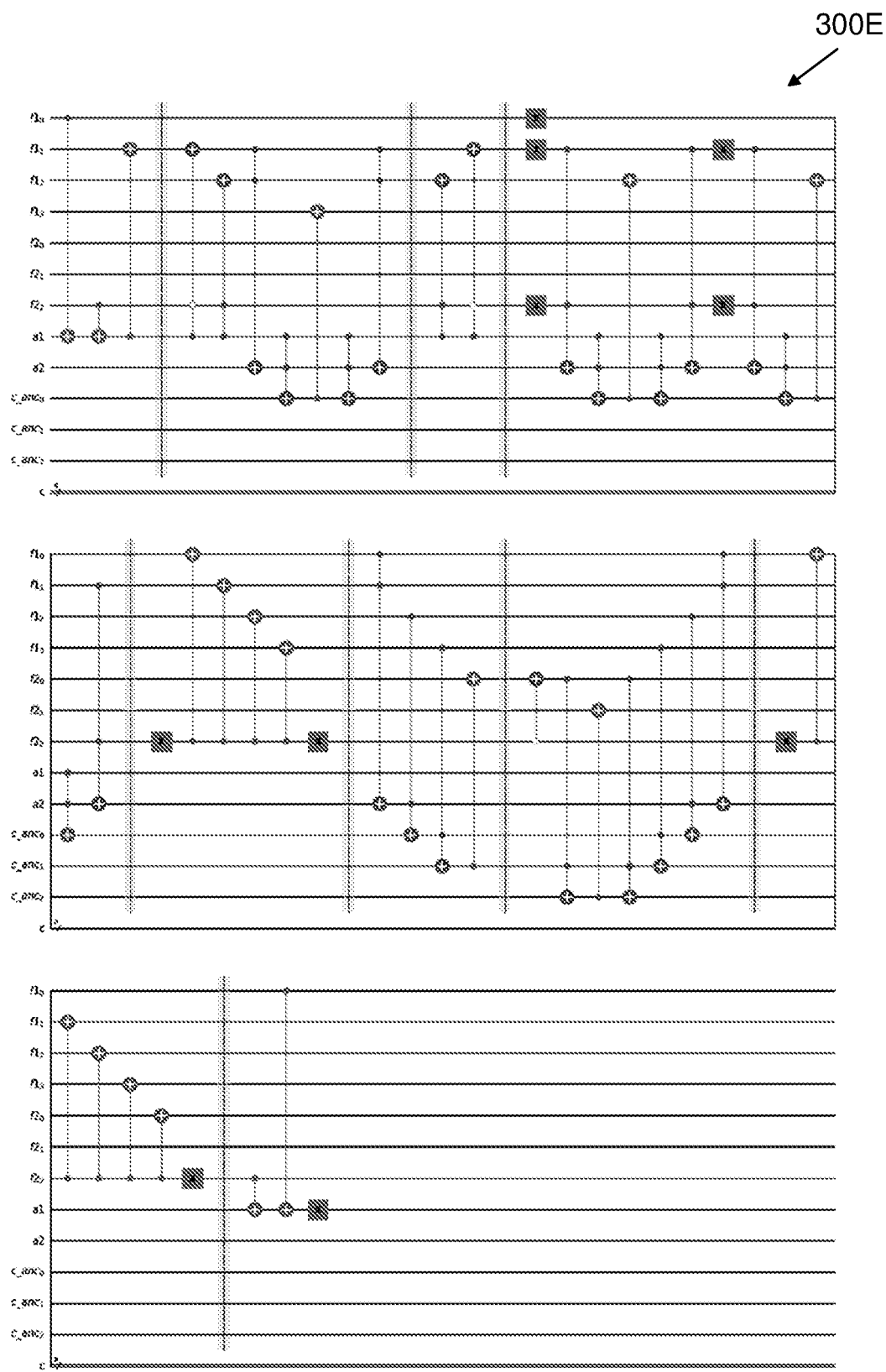
Figure 3F:
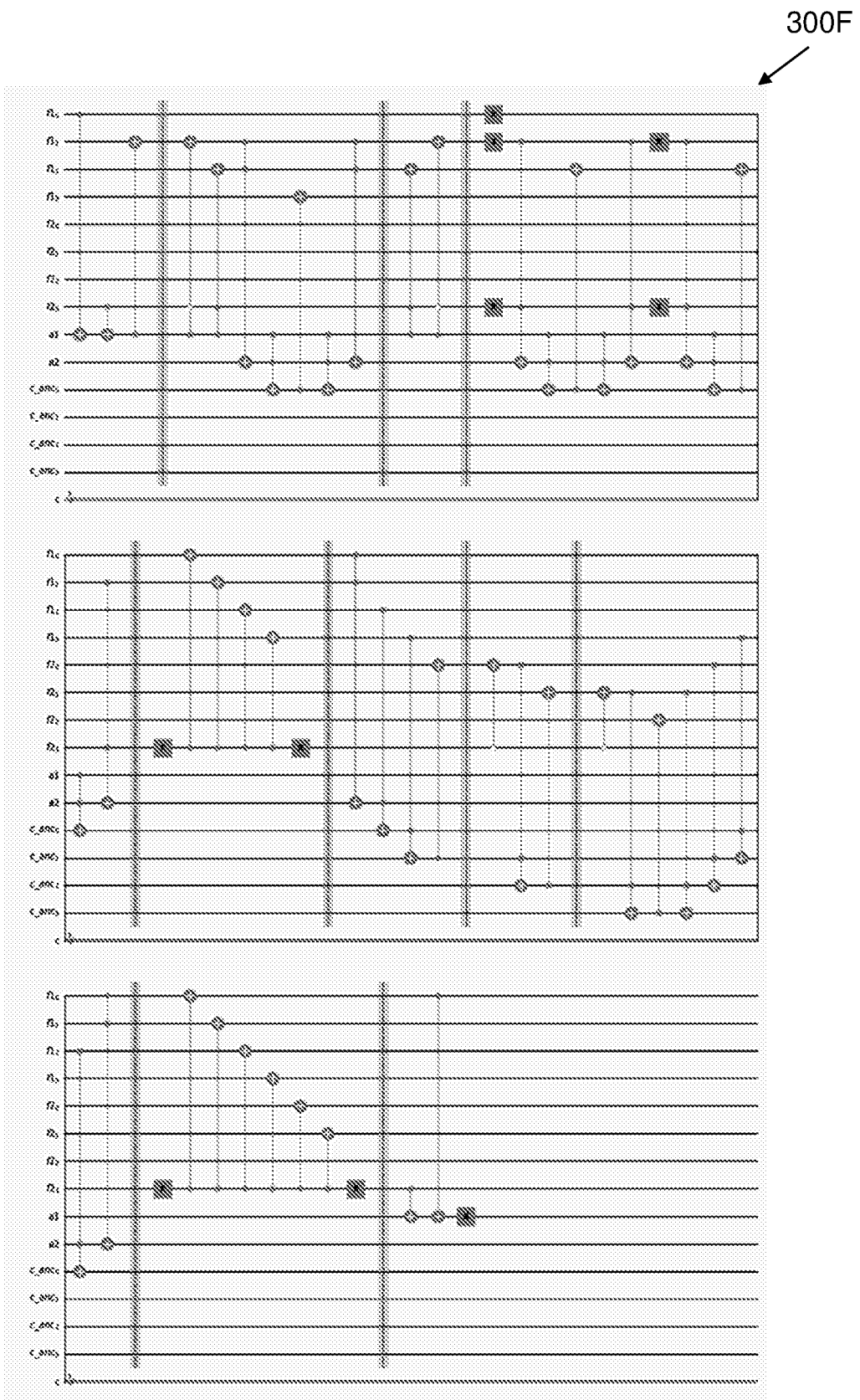

FIGS. 3D, 3E and 3F are schematic illustrations of variable ancilla register versions 300D, 300E and 300F of the quantum circuits 300A, 300B and 300C, respectively, in accordance with an embodiment of the present disclosure. The variable ancilla register versions 300D, 300E and 300F are generated by applying decomposition using a variable ancilla register 350 (c_anc) having N−4 qubits. The third multi-controlled gate 3243 of the first segment 324 is decomposed into a first sub-circuit 370, the sixth multi-controlled gate 3246 of the first segment 324 is decomposed into a second sub-circuit 372, and the seventh multi-controlled gate 3247 of the first segment 324 is decomposed into a third sub-circuit 374. Optionally, in this regard, the method further comprises setting up, for the decomposition in the quantum circuit, a second ancilla register 318 (a2) and the variable ancilla register 350 (c_anc) having N−4 qubits. The number of qubits in the second ancilla register 318 (a2) is also fixed, and is equal to one. Each multi-controlled gate (having more than two controls) is decomposed using a decomposition algorithm. Such decomposition algorithms are well known in the art.

The quantum circuits 300D, 300E and 300F pertain to the variable ancilla register configuration. The main difference between the variable ancilla register configuration and the fixed ancilla register configuration lies in the decomposition of the multi-controlled gates having more than two controls into a set of two-controlled gates (namely, Toffoli gates) by using the variable ancilla register as a temporary storage.

The technical benefit of such a decomposition is that when the number of working qubits is increased, the scale up of the quantum circuits 300D, 300E and 300F is logarithmic, which is far less expensive as compared to the scale up of the non-optimized quantum circuit 200A. In other words, the quantum circuits 300D, 300E and 300F are logarithmically scalable in terms of the number of computational states.

Optionally, the first sub-circuit 370 comprises four two-controlled gates and a CX gate, applied in a sequential order of: a first two-controlled gate, a second two-controlled gate, the CX gate, a third two-controlled gate and a fourth two-controlled gate, wherein:

the first two-controlled gate and the fourth two-controlled gate use the second working qubit ($f1_1$) and the third working qubit ($f1_2$) of the first quantum register 312 (f1) as controls corresponding to a state of |1>, and an ancilla qubit of the second ancilla register 318 (a2) as a target, the second two-controlled gate and third two-controlled gate use the ancilla qubit of the first ancilla register 316 (a1) and the ancilla qubit of the second ancilla register 318 (a2) as controls corresponding to a state of |1>, and a first qubit ($c\_anc_0$) of the variable ancilla register 350 (c_anc) as a target, and the CX gate uses the first qubit ($c\_anc_0$) of the variable ancilla register 350 (c_anc) as a control corresponding to a state of |1>, and the fourth working qubit ($f1_3$) of the first quantum register 312 (f1) as a target.

Optionally, each of the second sub-circuit 372 and the third sub-circuit 374 comprises four two-controlled gates and a CX gate, applied in a sequential order of: a first two-controlled gate, a second two-controlled gate, the CX gate, a third two-controlled gate and a fourth two-controlled gate, wherein:

the first two-controlled gate and the fourth two-controlled gate use the second working qubit ($f1_1$) of the first quantum register 312 (f1) and the last working qubit ($f2_{N-5}$) of the second quantum register 314 (f2) as controls corresponding to a state of |1>, and the ancilla qubit of the second ancilla register 318 (a2) as a target, the second two-controlled gate and third two-controlled gate use the ancilla qubit of the first ancilla register 316 (a1) and the ancilla qubit of the second ancilla register 318 (a2) as controls corresponding to a state of |1>, and a first qubit ($c\_anc_0$) of the variable ancilla register 350 (c_anc) as a target, and the CX gate uses the first qubit ($c\_anc_0$) of the variable ancilla register 350 (c_anc) as a control corresponding to a state of |1>, and the third working qubit ($f1_2$) of the first quantum register 312 (f1) as a target.

Additionally, the second sub-circuit 372 further comprises an X gate applied before both controls of the first two-controlled gate of the second sub-circuit 372 and after both controls of the fourth two-controlled gate of the second sub-circuit 372. These X gates are incorporated in the second sub-circuit 372 because two out of the three controls of the sixth multi-controlled gate 3246 of the first segment 324 (that is decomposed into the second sub-circuit 372) corresponded to the state of |0> prior to decomposition.

Moreover, optionally, the N−5 multi-controlled gates 3266 of the cascade of the gates 3264 are decomposed into a sub-circuit 376. As mentioned earlier, the method optionally comprises setting up, for the decomposition in the quantum circuit, the second ancilla register 318 (a2) and the variable ancilla register 350 (c_anc) having N−4 qubits.

Optionally, the sub-circuit 376 comprises 2N−6 two-controlled gates and N−5 CX gates. As shown in FIG. 3D, for N equal to 6, the sub-circuit 376 comprises, in a sequential order: a first one of the 2N−6 two-controlled gates, a second one of the 2N−6 two-controlled gates, a third one of the 2N−6 two-controlled gates, a first one of the N−5 CX gates, a fourth one of the 2N−6 two-controlled gates, a fifth one of the 2N−6 two-controlled gates and a sixth one of the 2N−6 two-controlled gates, wherein:

the first one of the 2N−6 two-controlled gates and the sixth one of the 2N−6 two-controlled gates use the first working qubit ($f1_0$) and the second working qubit ($f1_1$) of the first quantum register 312 (f1) as controls corresponding to a state of |1>, and the ancilla qubit of the second ancilla register 318 (a2) as a target, the second one of the 2N−6 two-controlled gates and the fifth one of the 2N−6 two-controlled gates use the third working qubit ($f1_2$) of the first quantum register 312 (f1) and the ancilla qubit of the second ancilla register 318 (a2) as controls corresponding to a state of |1>, and a first qubit ($c\_anc_0$) of the variable ancilla register 350 (c_anc) as a target, the third one of the 2N−6 two-controlled gates and the fourth one of the 2N−6 two-controlled gates use the fourth working qubit ($f1_3$) of the first quantum register 312 (f1) and the first qubit ($c\_anc_0$) of the variable ancilla register 350 (c_anc) as controls corresponding to a state of |1>, and a second qubit ($c\_anc_1$) of the variable ancilla register 350 (c_anc) as a target, and the first one of the N−5 CX gates uses the second qubit ($c\_anc_1$) of the variable ancilla register 350 (c_anc) as a control corresponding to a state of |1>, and the first working qubit ($f2_0$) of the second quantum register 314 (f2) as a target.

Optionally, as shown in FIGS. 3E and 3F, for N greater than 6, the sub-circuit 376 further comprises a remainder of the 2N−6 two-controlled gates and a remainder of the N−5 CX gates arranged between the first one of the N−5 CX gates and the fourth one of the 2N−6 two-controlled gates, wherein the N−5 CX gates are arranged in an interleaved manner with sets comprising respective ones of the N−6 CX gates and respective ones of the 2N−6 two-controlled gates, and wherein a last one of the N−5 CX gates is followed by a last one of the 2N−6 two-controlled gates. This is illustrated in conjunction with FIGS. 3E and 3F for N=7 and 8, respectively. It will be appreciated that the aforementioned N−6 CX gates are original gates that existed in the quantum circuits for N greater than 6. For example, these N−6 CX gates existed in the quantum circuits 300B and 300C, as shown in FIGS. 3B and 3C, respectively.

As illustrated in FIGS. 3E and 3F, an addition of each new qubit into the (decomposed) quantum circuit introduces two additional Toffoli gates, two additional CX gates and one additional X gate. This dynamic is maintained for each new qubit that is added to the (decomposed) quantum circuit.

Additionally, during decomposition, the controls of the first set of CX gates 3260 and of the second set of CX gates 3262 are converted to correspond to a state of |1>, and an X gate is applied to said controls before and after the first set of CX gates 3260 as well as before and after the second set of CX gates 3262. These X gates are incorporated in the sub-circuit 376 because the controls of the first set of CX gates 3260 and the second set of CX gates 3262 corresponded to the state of |0> prior to decomposition.

FIG. 4A is a graph illustrating a number of CX gates (y-axis) as a function of qubits (x-axis) comparing the ancilla-free configuration of the non-optimized quantum circuits and the fixed-ancilla register configuration of the quantum circuits of the present disclosure, while FIG. 4B is a graph illustrating a number of CX gates (y-axis) as a function of states (x-axis) comparing the ancilla-free configuration of the non-optimized quantum circuits and the fixed-ancilla register configuration of the quantum circuits of the present disclosure.

To illustrate a benefit according to an embodiment of the present disclosure, in FIGS. 4A and 4B, solid lines pertain to the ancilla-free configuration of the non-optimized quantum circuits, while dashed lines pertain to the fixed-ancilla register configuration. It is evident that in the ancilla-free configuration, the number of CX gates increases exponentially with the number of qubits. The number of CX gates can be used as a metric for a quantum circuit to estimate the cost of the circuit (from implementation, reliability, etc. point of view). It is also evident that in the fixed-ancilla register configuration, the number of CX gates is greatly reduced. FIG. 4B is an illustration of the number of needed CX-gates (y-axis) as a function of states. Again, it is evident that embodiments of the present disclosure provide a surprising and significant benefit.

Indeed, at the cost of introducing one ancilla qubit (a1), the fixed-ancilla register configuration performs better than the ancilla-free configuration. It should be noted that the added ancilla register (a) is independent of an expansion of the working register (namely, the second quantum register (f2)) and it is fixed to one qubit (i.e. not relying on variable ancilla register). The linear slope of FIG. 4B is reduced from 5.99 to 1.49, which confirms that embodiments of the present disclosure provides a linear scaling up that is considerably less expensive in terms of required operations, whilst also exceeding the classical computation. In other words, by using the properties of quantum computing (namely, interference, superposition etc.), embodiments of the present disclosure facilitate scaling up that cannot be achieved on classical machines.

Figure 4C:
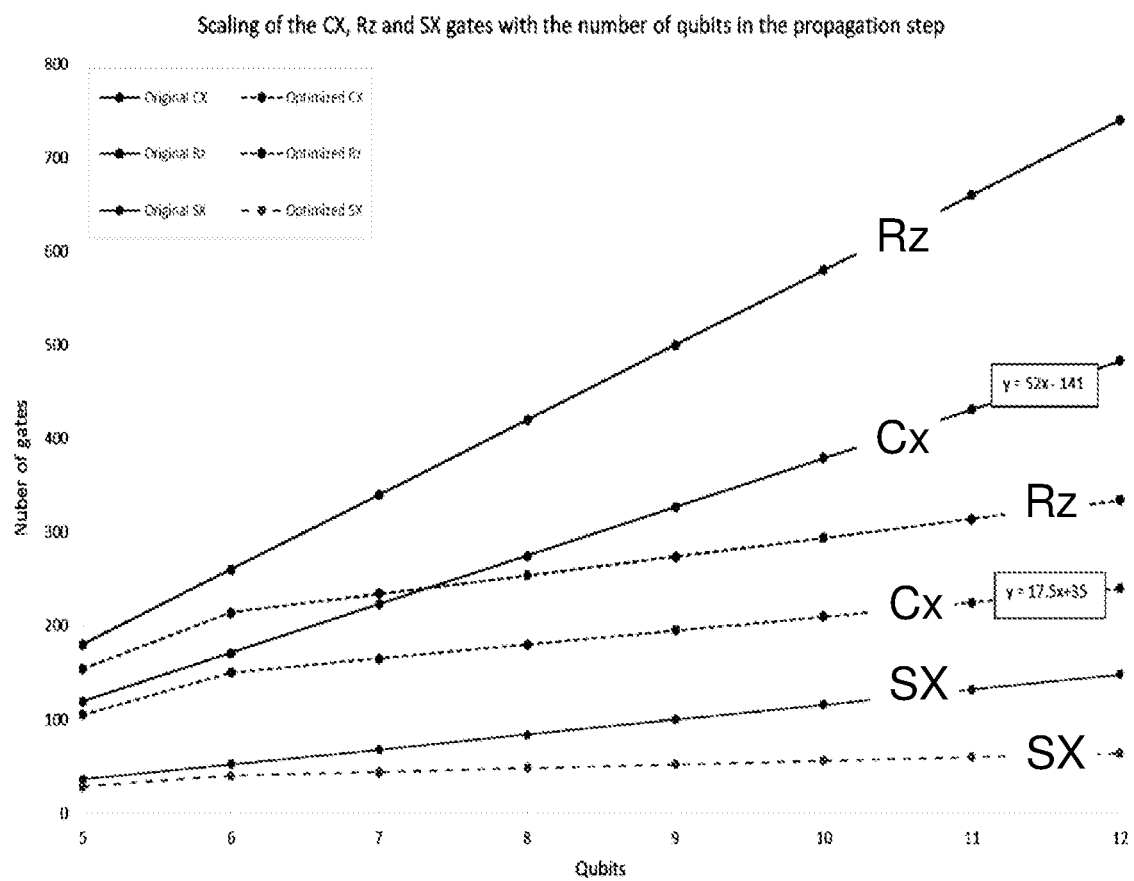
FIG. 4C is a graph illustrating the number of IBM set of basis gates CX, RZ and SX with respect to the number of qubits comparing variable ancilla register versions of the ancilla-free configuration of the non-optimized quantum circuits and variable ancilla register versions of the quantum circuits of the present disclosure.
Figure 4D:
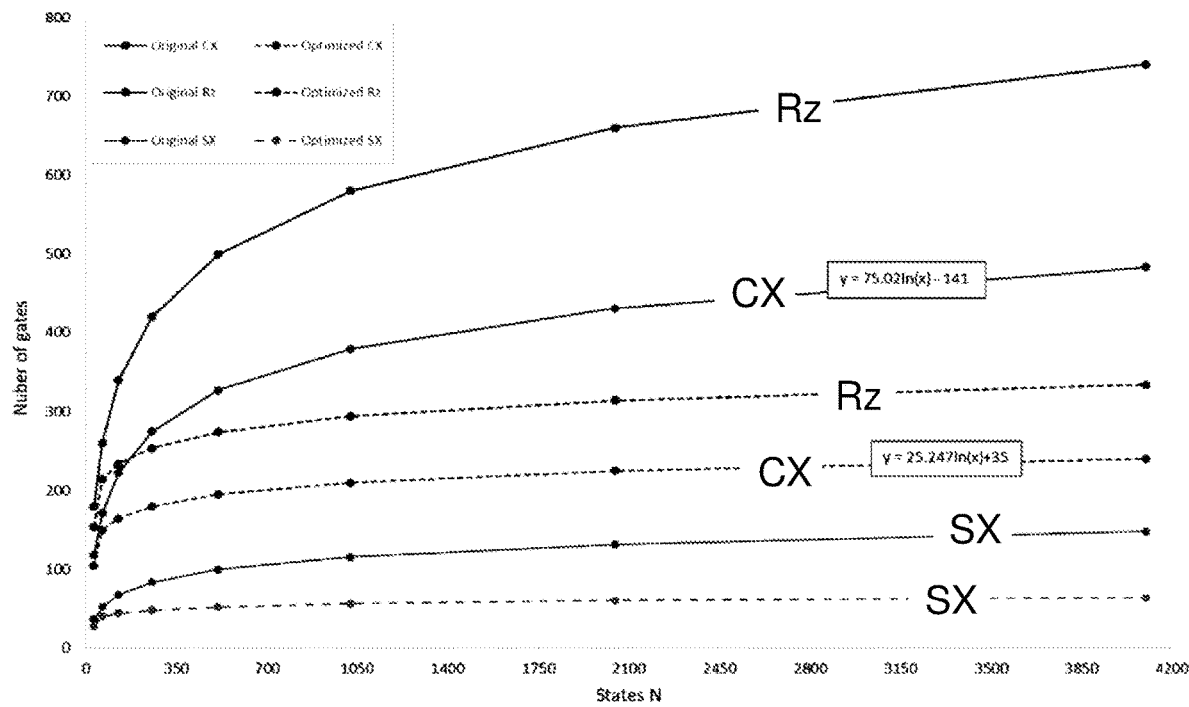
FIG. 4D is a graph illustrating the number of IBM set of basis gates CX, RZ and SX with respect to the number of computational states comparing the variable ancilla register versions of the ancilla-free configuration of the non-optimized quantum circuits and the variable ancilla register versions of the quantum circuits of the present disclosure.

Moreover, the scaling analysis between variable ancilla register versions (including the variable ancilla register version 200C) of the non-optimized quantum circuits 200A-200B and the variable ancilla register versions 300D-300F of the quantum circuits 300A-300C in terms of the number of IBM set of basis gates CX, RZ and SX with respect to the number of qubits is shown in FIG. 4C, and a comparison between the two in terms of the number of IBM set of basis gates CX, RZ and SX with respect to the number of computational states is shown in FIG. 4D. Solid lines pertain to the variable ancilla register versions of the ancilla-free configuration of the non-optimized quantum circuits, while dashed lines pertain to the variable ancilla register configuration of the quantum circuits 300D-300F (which are the variable ancilla register versions of the quantum circuits 300A-300C, respectively).

It is evident from FIGS. 4A-4D that the optimized quantum circuits scale up significantly better for all basis gates, and for both configurations (namely, the fixed ancilla register configuration and the variable ancilla register configuration). Besides, there clearly is a massive gate reduction, as compared to the non-optimized quantum circuits. Also, by comparing FIGS. 2C and 3D, it can also be seen that the variable ancilla register version of the optimized quantum circuit 300D requires one less qubit in the variable ancilla register as compared to the variable ancilla register version of the non-optimized quantum circuit 200C.

The present disclosure also relates to a quantum computer or a quantum simulator configured to execute the aforementioned method of setting up the quantum circuit for computational basis state shift as described above. The present disclosure further relates to a non-transitory computer-readable medium having computer program instructions stored thereon, the computer program instructions being executable by at least one processor in a classical computer to control a quantum computer or a quantum simulator to perform the aforementioned method. Various embodiments and variants disclosed above, with respect to the aforementioned method, apply mutatis mutandis to the quantum computer or the quantum simulator, and to the non-transitory computer-readable medium.

The invention claimed is:

1. A method of setting up a quantum circuit for computational basis state shift, the method comprising:
   setting up, for the quantum circuit, a first quantum register, a second quantum register and a first ancilla register, wherein the first quantum register comprises four qubits and the second quantum register comprises N–4 qubits;
   applying to the first quantum register, the second quantum register and the first ancilla register in a sequential order:
   (i) an initial step comprising three CX gates and a first X gate;
   (ii) a first segment comprising seven multi-controlled gates;
   (iii) a second segment comprising a first set of CX gates, a second set of CX gates and a cascade of gates arranged between the first set and the second set; and
   (iv) a third segment comprising two CX gates and a second X gate.

2. The method according to claim 1, wherein the three CX gates of the initial step are applied in a sequential order of:
   a first CX gate of the initial step that uses a first working qubit of the first quantum register as a control corresponding to a state of |1>, and an ancilla qubit of the first ancilla register as a target;
   a second CX gate of the initial step that uses a last working qubit of the second quantum register as a control corresponding to a state of |1>, and the ancilla qubit of the first ancilla register as a target; and
   a third CX gate of the initial step that uses the ancilla qubit of the first ancilla register as a control corresponding to a state of |1>, and a second working qubit of the first quantum register as a target; and
   the first X gate of the initial step is applied to the first working qubit of the first quantum register.

3. The method according to claim 1, wherein the seven multi-controlled gates of the first segment are applied in a sequential order of: a first multi-controlled gate, a second multi-controlled gate, a third multi-controlled gate, a fourth multi-controlled gate, a fifth multi-controlled gate, a sixth multi-controlled gate, and a seventh multi-controlled gate, wherein:
   the first multi-controlled gate and the fifth multi-controlled gate use the last working qubit of the second quantum register as a first control corresponding to a state of |0>, the ancilla qubit of the first ancilla register as a second control corresponding to a state of |1>, and the second working qubit of the first quantum register as a target;
   the second multi-controlled gate and the fourth multi-controlled gate use the last working qubit of the second quantum register and the ancilla qubit of the first ancilla register as controls corresponding to a state of |1>, and a third working qubit of the first quantum register as a target;
   the third multi-controlled gate uses the second working qubit of the first quantum register, the third working qubit of the first quantum register and the ancilla qubit of the first ancilla register as controls corresponding to a state of |1>, and a fourth working qubit of the first quantum register as a target;
   the sixth multi-controlled gate uses the second working qubit of the first quantum register and the last working qubit of the second quantum register as controls corresponding to a state of |0>, the ancilla qubit of the first ancilla register as a control corresponding to a state of |1>, and the third working qubit of the first quantum register as a target; and
   the seventh multi-controlled gate uses the second working qubit of the first quantum register, the last working qubit of the second quantum register and the ancilla qubit of the first ancilla register as controls corresponding to a state of |1>, and the third working qubit of the first quantum register as a target.

4. The method according to claim 3, wherein the third multi-controlled gate of the first segment is decomposed into a first sub-circuit, the sixth multi-controlled gate of the first segment is decomposed into a second sub-circuit, and the seventh multi-controlled gate of the first segment is decomposed into a third sub-circuit, wherein the method further comprises setting up, for the decomposition in the quantum circuit, a second ancilla register and a variable ancilla register having N–4 qubits.

5. The method according to claim 4, wherein the first sub circuit comprises four two-controlled gates and a CX gate, applied in a sequential order of: a first two-controlled gate, a second two-controlled gate, the CX gate, a third two-controlled gate and a fourth two-controlled gate, wherein:
   the first two-controlled gate and the fourth two-controlled gate use the second working qubit and the third working qubit of the first quantum register as controls corresponding to a state of |1>, and an ancilla qubit of the second ancilla register as a target,
   the second two-controlled gate and third two-controlled gate use the ancilla qubit of the first ancilla register and the ancilla qubit of the second ancilla register as controls corresponding to a state of |1>, and a first qubit of the variable ancilla register as a target, and
   the CX gate uses the first qubit of the variable ancilla register as a control corresponding to a state of |1>, and the fourth working qubit of the first quantum register as a target.

6. The method according to claim 4, wherein each of the second sub-circuit and the third sub-circuit comprises four two-controlled gates and a CX gate, applied in a sequential order of: a first two-controlled gate, a second two-controlled gate, the CX gate, a third two-controlled gate and a fourth two-controlled gate, wherein:
   the first two-controlled gate and the fourth two-controlled gate use the second working qubit of the first quantum register and the last working qubit of the second quantum register as controls corresponding to a state of |1>, and the ancilla qubit of the second ancilla register as a target,
   the second two-controlled gate and third two-controlled gate use the ancilla qubit of the first ancilla register and the ancilla qubit of the second ancilla register as controls corresponding to a state of |1>, and a first qubit of the variable ancilla register as a target, and
   the CX gate uses the first qubit of the variable ancilla register as a control corresponding to a state of |1>, and the third working qubit of the first quantum register as a target,
   wherein the second sub-circuit further comprises an X gate applied before both controls of the first two-controlled gate of the second sub-circuit and after both controls of the fourth two-controlled gate of the second sub-circuit.

7. The method according to claim 1, wherein the first set of CX gates of the second segment comprises four CX gates that use in following order: the first working qubit, the second working qubit, the third working qubit and the fourth working qubit of the first quantum register as respective targets, each of the four CX gates of the first set of CX gates using the last working qubit of the second quantum register as a control corresponding to a state of |0>;

wherein the second set of CX gates of the second segment comprises N−2 CX gates that use in following order: the first working qubit ($f1_0$), the second working qubit, the third working qubit and up to $(N-2)^{th}$ working qubit as respective targets, each of the N−2 CX gates of the second set of CX gates using the last working qubit of the second quantum register as a control corresponding to a state of |0>; and wherein the cascade of gates is arranged after the first set of CX gates and before the second set of CX gates, and wherein a number of gates in the cascade is a function of a total number (N) of working qubits.

8. The method according to claim 7, wherein the cascade of the gates comprises:

N−5 multi-controlled gates arranged as a sequence of gates indexed from 1 to N−5, wherein within the sequence, a multi-controlled gate indexed 'M' uses as controls all working qubits in the first quantum register and M−1 first working qubits of the second quantum register, wherein the controls correspond to a state of |1>, and uses as a target $M^{th}$ working qubit of the second quantum register; and N−6 CX gates, if N is greater than 6, wherein the N−5 multi-controlled gates and the N−6 CX gates are arranged in an interleaved manner, the cascade of the gates starting with a first multi-controlled gate from amongst the N−5 multi-controlled gates, each CX gate using the last working qubit ($f2_{N-5}$) of the second quantum register as a control corresponding to a state of |0>, wherein an $L^{th}$ CX gate uses as a target a same working qubit that is used as a target by an $L^{th}$ multi-controlled gate.

9. The method according to claim 8, wherein the N−5 multi-controlled gates of the cascade of the gates are decomposed into a sub-circuit wherein the method further comprises setting up, for the decomposition in the quantum circuit, a second ancilla register and a variable ancilla register having N−4 qubits.

10. The method according to claim 9, wherein the sub-circuit comprises 2N−6 two-controlled gates and N−5 CX gates, wherein for N equal to 6, the sub-circuit comprises, in a sequential order: a first one of the 2N−6 two-controlled gates, a second one of the 2N−6 two-controlled gates, a third one of the 2N−6 two-controlled gates, a first one of the N−5 CX gates, a fourth one of the 2N−6 two-controlled gates, a fifth one of the 2N−6 two-controlled gates and a sixth one of the 2N−6 two-controlled gates, wherein:

the first one of the 2N−6 two-controlled gates and the sixth one of the 2N−6 two-controlled gates use the first working qubit and the second working qubit of the first quantum register as controls corresponding to a state of |1>, and an ancilla qubit of the second ancilla register as a target, the second one of the 2N−6 two-controlled gates and the fifth one of the 2N−6 two-controlled gates use the third working qubit of the first quantum register and the ancilla qubit of the second ancilla as controls corresponding to a state of |1>, and a first qubit of the variable ancilla register as a target, the third one of the 2N−6 two-controlled gates and the fourth one of the 2N−6 two-controlled gates use the fourth working qubit of the first quantum register and the first qubit of the variable ancilla register as controls corresponding to a state of |1>, and a second qubit of the variable ancilla register as a target, and the first one of the N−5 CX gates uses the second qubit of the variable ancilla register as a control corresponding to a state of |1>, and the first working qubit of the second quantum register as a target.

11. The method according to claim 10, wherein for N greater than 6, the sub-circuit further comprises a remainder of the 2N−6 two-controlled gates and a remainder of the N−5 CX gates arranged between the first one of the N−5 CX gates and the fourth one of the 2N−6 two-controlled gates, wherein the N−5 CX gates are arranged in an interleaved manner with sets comprising respective ones of the N−6 CX gates and respective ones of the 2N−6 two-controlled gates, and wherein a last one of the N−5 CX gates is followed by a last one of the 2N−6 two-controlled gates.

12. The method according to claim 7, wherein during decomposition, the controls of the first set of CX gates and of the second set of CX gates are converted to correspond to a state of |1>, and an X gate is applied to said controls before and after the first set of CX gates as well as before and after the second set of CX gates.

13. The method according to claim 1, wherein the two CX gates and the second X gate of the third segment are applied in a sequential order of:

a first CX gate of the third segment that uses the last working qubit of the second quantum register as a control corresponding to a state of |1>, and the ancilla qubit of the first ancilla register as a target; and a second CX gate of the third segment that uses the first working qubit of the first quantum register as a control corresponding to a state of |1>, and the ancilla qubit of the first ancilla register as a target, wherein the second X gate of the third segment is applied to the ancilla qubit of the first ancilla register.

14. A quantum computer or a quantum simulator configured to execute a method according to claim 1.

15. A non-transitory computer-readable medium having computer program instructions stored thereon, the computer program instructions being executable by at least one processor in a classical computer to control a quantum computer or a quantum simulator to perform a method according to claim 1.

* * * * *